A. F. MASURY AND A. H. LEIPERT.
YIELDING SUPPORT FOR BRAKE RODS.
APPLICATION FILED DEC. 6, 1920.
1,385,463. Patented July 26, 1921.
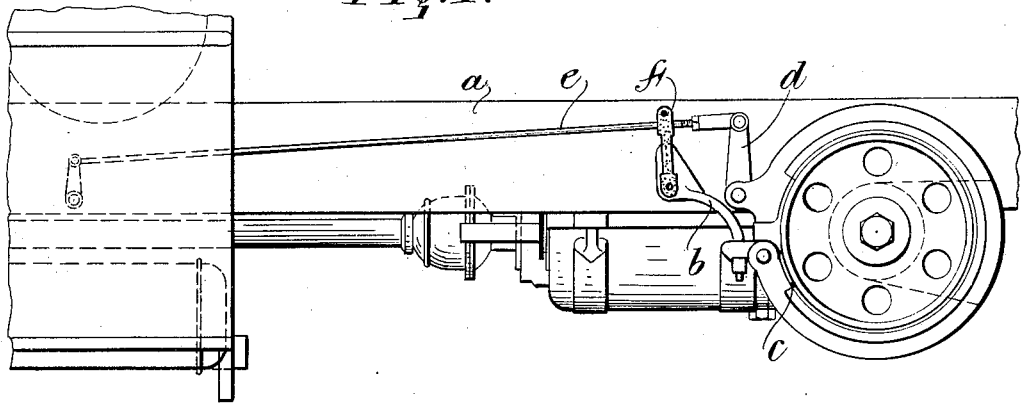
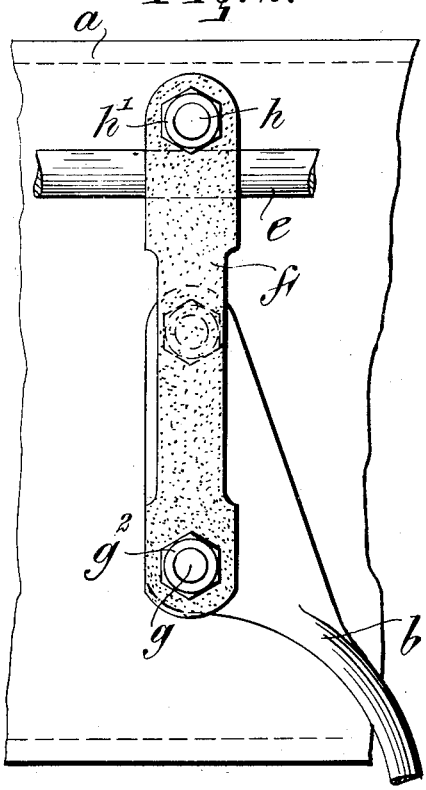
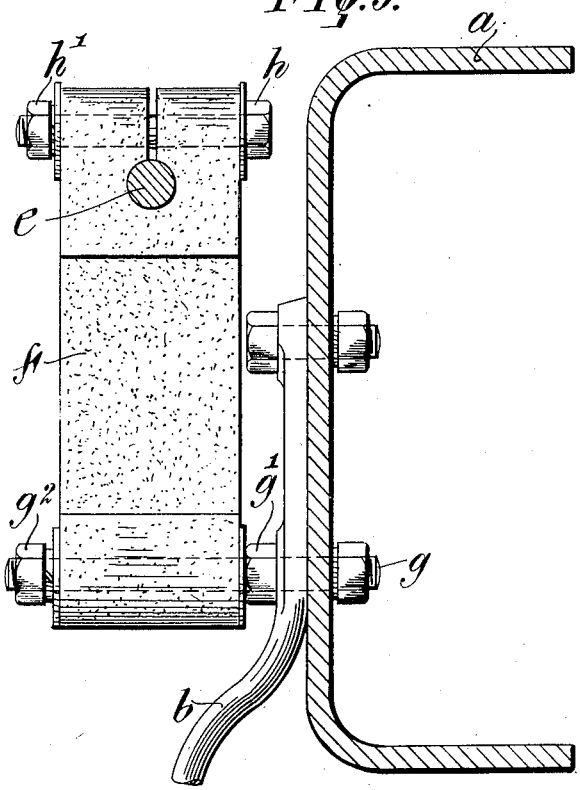
INVENTOR
Alfred F. Masury
August H. Leipert
BY
Redding Greeley
ATTORNEYS

UNITED STATES PATENT OFFICE.

ALFRED F. MASURY AND AUGUST H. LEIPERT, OF NEW YORK, N. Y., ASSIGNORS TO INTERNATIONAL MOTOR COMPANY, OF NEW YORK, N. Y., A CORPORATION OF DELAWARE.

YIELDING SUPPORT FOR BRAKE-RODS.

1,385,463.  Specification of Letters Patent.  Patented July 26, 1921.

Application filed December 6, 1920. Serial No. 428,472.

*To all whom it may concern:*

Be it known that we, ALFRED F. MASURY and AUGUST H. LEIPERT, citizens of the United States, residing, respectively, in the borough of Manhattan and in the borough of Queens of the city of New York, in the State of New York, have jointly invented certain new and useful Improvements in Yielding Supports for Brake-Rods, of which the following is a specification, reference being had to the accompanying drawings, forming a part hereof.

This invention relates to a simple but useful device which is carried on the frame of an automobile and secured thereto and to a brake rod in such manner as to afford a measure of support for the brake rod, prevent it from rattling and assist in its return upon release of the brakes. In automobile practice and particularly in truck constructions either no provision has been made for holding the brake rods against free movements or else a form of metal brake rod support has been employed which does not overcome the rattling of the rod or assist in its movements.

A further object is to provide a device of the character described which is inexpensive to manufacture in that it can be molded and requires little cleaning up, if any, to make a finished product, is of a simple one-piece form to eliminate joints, is of a yielding material such as rubber of sufficient stiffness to afford an adequate support while impressing a spring action on the rod, and can be secured in place without requiring any change in the standard construction of the vehicle.

These and other objects will appear more particularly hereinafter as the description proceeds. Reference is now to be had to the accompanying drawings which indicates the application of one form of the improved device to the brake rod of a truck. In the drawings—

Figure 1 is a view in side elevation of so much of a truck structure as is necessary for an understanding of the application of the device to the brake rod thereof.

Fig. 2 is a fragmentary detail view on a somewhat larger scale of the device shown in Fig. 1.

Fig. 3 is a view in transverse section through the side frame member of the truck shown in Fig. 1, the brake rod being shown in section and the improved support therefor being shown in end elevation.

The side frame member $a$ of the truck chassis shown in the drawings may have bolted thereto a supporting bracket $b$ for a suitable brake band $c$, the free end of which may be operatively engaged through a lever $d$ with a brake rod $e$ by which the brake is applied in a manner well known. The brake rod $e$ is usually of rather substantial length, extending forwardly of the frame member $a$ to a position convenient for operation by hand or foot devices. The length of this rod results in a relative amount of rattle, which rather increases with the age of the vehicle and with the wearing in of all of the associated parts. Further, it is the usual practice to place entire reliance upon a spring operatively connected in the operative devices for the brake band to restore all of the parts to normal position upon release. In accordance with the present invention it is proposed to provide a very simple and inexpensive support and guide for the brake rod $e$ which will hold it against rattling and will assist in its return to release position. One form of device is illustrated in the drawing at $f$. This comprises a one-piece block, preferably of rubber, which can be molded and requires little cleaning up, if any, to make a finished product. The block is of such form, dimensions and composition, as to possess adequate stiffness to support the brake rod and yet it is sufficiently yielding to impress a spring action thereon for the purpose of assisting its movement to release position. One convenient way of mounting this block and securing it in operative relation to the brake rod is illustrated. The bolt $g$ which passes through the frame member $a$ for the support of the brake may be extended to pass through the block $f$ and serve as a support therefor. It will be desirable to secure the bracket $b$ in place on the bolt $g$ by means of a nut $g'$ and to secure the block $f$ in place by another nut $g^2$ threaded on the bolt adjacent its outer end. In this way, upon removal of the nut $g^2$ the block $f$ can be removed without disturbing the bracket $b$. The connection to the brake rod $e$ is made conveniently by passing the rod $e$ through an opening therefor adjacent the upper end of the block and splitting the latter so as to afford a clamping action thereof on the rod under the influence of a bolt $h$ when its nut $h'$ is set up on.

By the construction described it will be evident that the rod $e$ has a bearing of rather substantial length within the block $f$ and that the block can be clamped so firmly on its support $g$ as to be held against pivotal movement thereon. When the brake is in release position as shown in the drawings the block $f$ will not be under tension. When, however, the brake is applied by pulling the rod $e$ to the left, as viewed in Figs. 1 and 2, the rod $f$ will be placed under tension and oppose the application of the brakes to a desirable degree. Upon release the block $f$, because of its yielding character, will impress a spring action on the rod and assist returning it to release position. At all times the block $f$ will serve its primary function as a support and anti-rattle device for the brake rod holding its against free movement and preventing it from making the common objectionable noise. It is evident that the principle of the invention can be retained in a construction in which the block $f$ assumes other forms and its connections to the brake rod and to the side frame member are accomplished by other means than those illustrated and described, these matters of design and detail being within the range of skill of a mechanic. Further, it will be evident that the principle of the invention will be retained in a construction wherein the block is not held against pivotal movement on its supporting bolt $g$, as is assumed in the illustrated embodiment, since the block is of yielding character and can be placed under tension even when it swings about the bolt $g$. Such tension may arise from elongation of the block as well as through lateral spring stresses set up in its body.

We claim as our invention:

1. As an article of manufacture a support for a brake rod comprising a block of stiff but yielding material adapted to be supported on the chassis of a vehicle and to be secured to the brake rod.

2. In combination with a brake rod of a motor vehicle and the side frame member thereof, a support for the brake rod comprising a block of yielding material, means to secure the block to the frame member and means to secure the block to the brake rod.

3. In combination with a brake rod and side frame member of a motor vehicle, a support for the brake rod, comprising a block of yielding material, a supporting bolt therefor passing through the side frame member and engaged with the block to hold the latter against pivotal movement on the bolt and means to secure the block to the rod including a split section of the block and a bolt passing through said split section to clamp its portions about the rod.

4. In combination with a side frame member, brake rod and brake drum for a motor vehicle, a supporting bracket for the drum, a bolt to secure the bracket to the side frame member, a support for the brake rod comprising a block of yielding material supported on said bolt adjacent one end and means to secure the block to the brake rod adjacent the other end.

This specification signed this 29th day of November A. D. 1920.

ALFRED F. MASURY.
AUGUST H. LEIPERT.